US012602322B2

(12) United States Patent
Wang et al.

(10) Patent No.: US 12,602,322 B2
(45) Date of Patent: Apr. 14, 2026

(54) INTERMEDIATE REPRESENTATION METHOD AND APPARATUS FOR COMPILING COMPUTATION GRAPHS

(71) Applicant: ZHEJIANG LAB, Hangzhou (CN)

(72) Inventors: Hongsheng Wang, Hangzhou (CN); Aimin Pan, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 750 days.

(21) Appl. No.: 18/071,958

(22) Filed: Nov. 30, 2022

(65) Prior Publication Data

US 2024/0104016 A1      Mar. 28, 2024

Related U.S. Application Data

(63) Continuation of application No. PCT/CN2022/124002, filed on Oct. 9, 2022.

(30) Foreign Application Priority Data

Sep. 27, 2022      (CN) .......................... 202211177783.1

(51) Int. Cl.
| | |
|---|---|
| *G06F 8/41* | (2018.01) |
| *G06F 12/0802* | (2016.01) |
| *G06N 3/04* | (2023.01) |
| *G06N 3/048* | (2023.01) |
| *G06N 3/063* | (2023.01) |

(Continued)

(52) U.S. Cl.
CPC ......... *G06F 12/0802* (2013.01); *G06N 3/063* (2013.01); *G06F 8/42* (2013.01); *G06F 8/433*

(2013.01); *G06F 8/452* (2013.01); *G06F 8/65* (2013.01); *G06F 8/71* (2013.01);

(Continued)

(58) Field of Classification Search
CPC ...... G06F 12/0802; G06F 8/433; G06F 8/452; G06F 8/65; G06F 8/71; G06F 8/42; G06N 3/063; G06N 3/08; G06N 3/04; G06N 3/082; G06N 3/084
See application file for complete search history.

(56) References Cited

U.S. PATENT DOCUMENTS

| | | | | | |
|---|---|---|---|---|---|
| 11,232,360 | B1 * | 1/2022 | Nama | .................... | G06N 3/084 |
| 11,809,849 | B1 * | 11/2023 | Zheng | .................... | G06N 3/048 |

(Continued)

FOREIGN PATENT DOCUMENTS

| | | |
|---|---|---|
| CN | 114186687 A | 3/2022 |
| CN | 114492772 A | 5/2022 |
| CN | 114936099 A | 8/2022 |

*Primary Examiner* — Anibal Riveracruz

(74) *Attorney, Agent, or Firm* — IPro, PLLC

(57) ABSTRACT

A process for generating an intermediate representation methodically compiles a neural network into a computation graph. First, a distinct node is built for every tensor variable within the graph, and this node is linked to a collection of pointers that reference the variable. Next, the method undertakes an analysis of the constraint relationships among these tensor variables. Using this information, it iteratively builds a topological graph that serves as the intermediate representation. Finally, this representation allows for the crucial step of analyzing variables that use different aliases but point to the same memory location, enabling the system to efficiently allocate a register for these aliased tensor variables.

10 Claims, 10 Drawing Sheets

(51) Int. Cl.

| | |
|---|---|
| *G06F 8/65* | (2018.01) |
| *G06F 8/71* | (2018.01) |
| *G06N 3/08* | (2023.01) |
| *G06N 3/084* | (2023.01) |

(52) U.S. Cl.

CPC ................. *G06N 3/04* (2013.01); *G06N 3/08* (2013.01); *G06N 3/084* (2013.01)

(56) References Cited

U.S. PATENT DOCUMENTS

| | | | |
|---|---|---|---|
| 11,995,529 B2 * | 5/2024 | Nama ................... | G06N 3/0464 |
| 12,417,082 B1 * | 9/2025 | Xu .......................... | G06N 3/063 |
| 2020/0110984 A1 | 4/2020 | Chatterjee et al. | |
| 2020/0319861 A1 | 10/2020 | Lacey et al. | |
| 2020/0371856 A1 * | 11/2020 | Zhang ................. | G06F 11/0754 |
| 2022/0414455 A1 * | 12/2022 | Collins .................... | G06N 3/08 |
| 2023/0121044 A1 * | 4/2023 | Grover ...................... | G06F 8/30 |
| | | | 706/25 |

* cited by examiner

| Operation primitive | Constraint relationship | | | Intermediate representation |
|---|---|---|---|---|
| $y = \&x$ | $P(y)$ | $\supseteq$ | $\{x\}$ | $\{z\}$   $\{x\}$ |
| $x = \&z$ | $P(x)$ | $\supseteq$ | $\{z\}$ | $x$    $y$ |

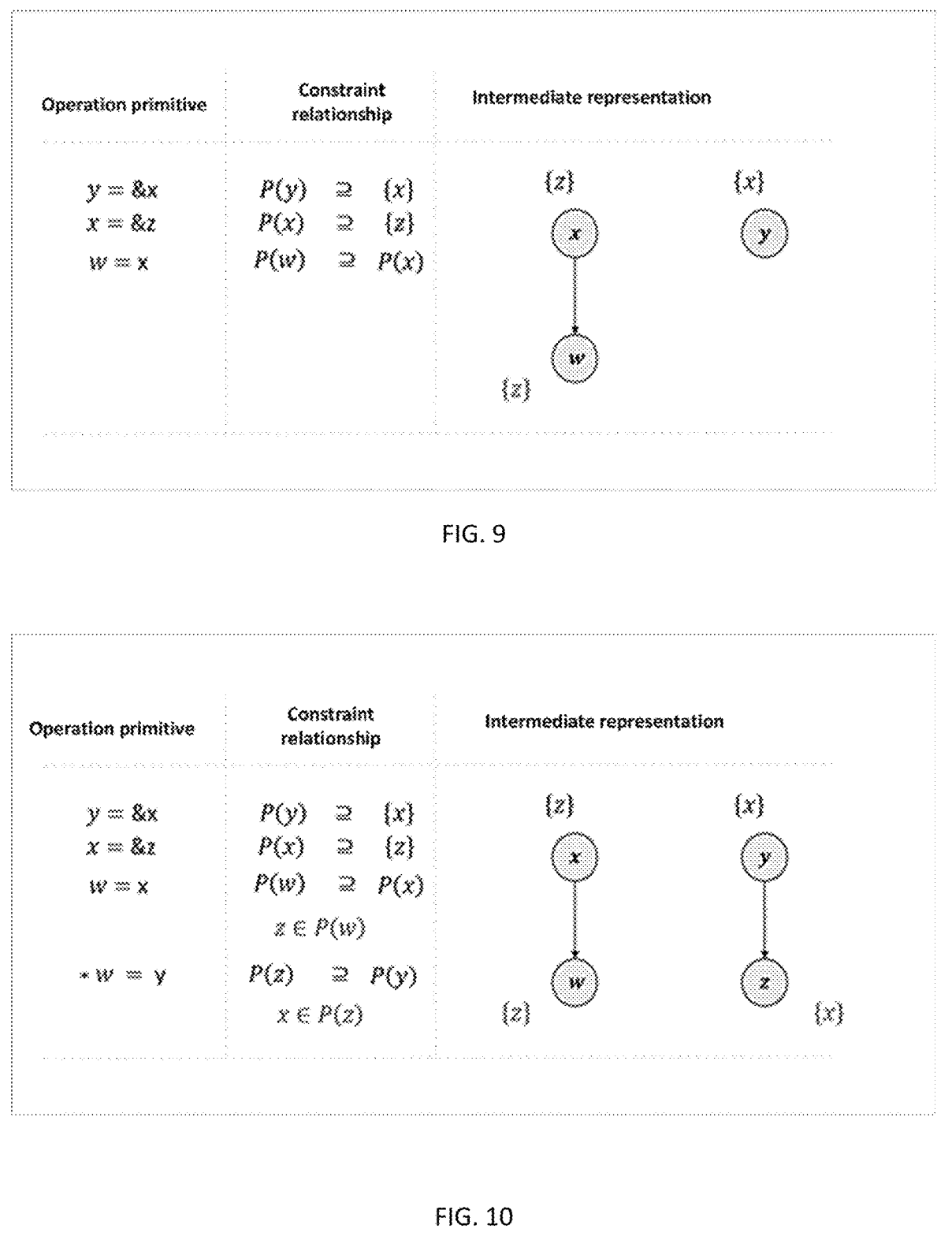

| Operation primitive | Constraint relationship | Intermediate representation |
|---|---|---|
| $y = \&x$ <br> $x = \&z$ <br> $w = x$ | $P(y) \supseteq \{x\}$ <br> $P(x) \supseteq \{z\}$ <br> $P(w) \supseteq P(x)$ | |

FIG. 9

| Operation primitive | Constraint relationship | Intermediate representation |
|---|---|---|
| $y = \&x$ <br> $x = \&z$ <br> $w = x$ <br><br> $*w = y$ | $P(y) \supseteq \{x\}$ <br> $P(x) \supseteq \{z\}$ <br> $P(w) \supseteq P(x)$ <br> $z \in P(w)$ <br> $P(z) \supseteq P(y)$ <br> $x \in P(z)$ | |

FIG. 10

Figure 11:
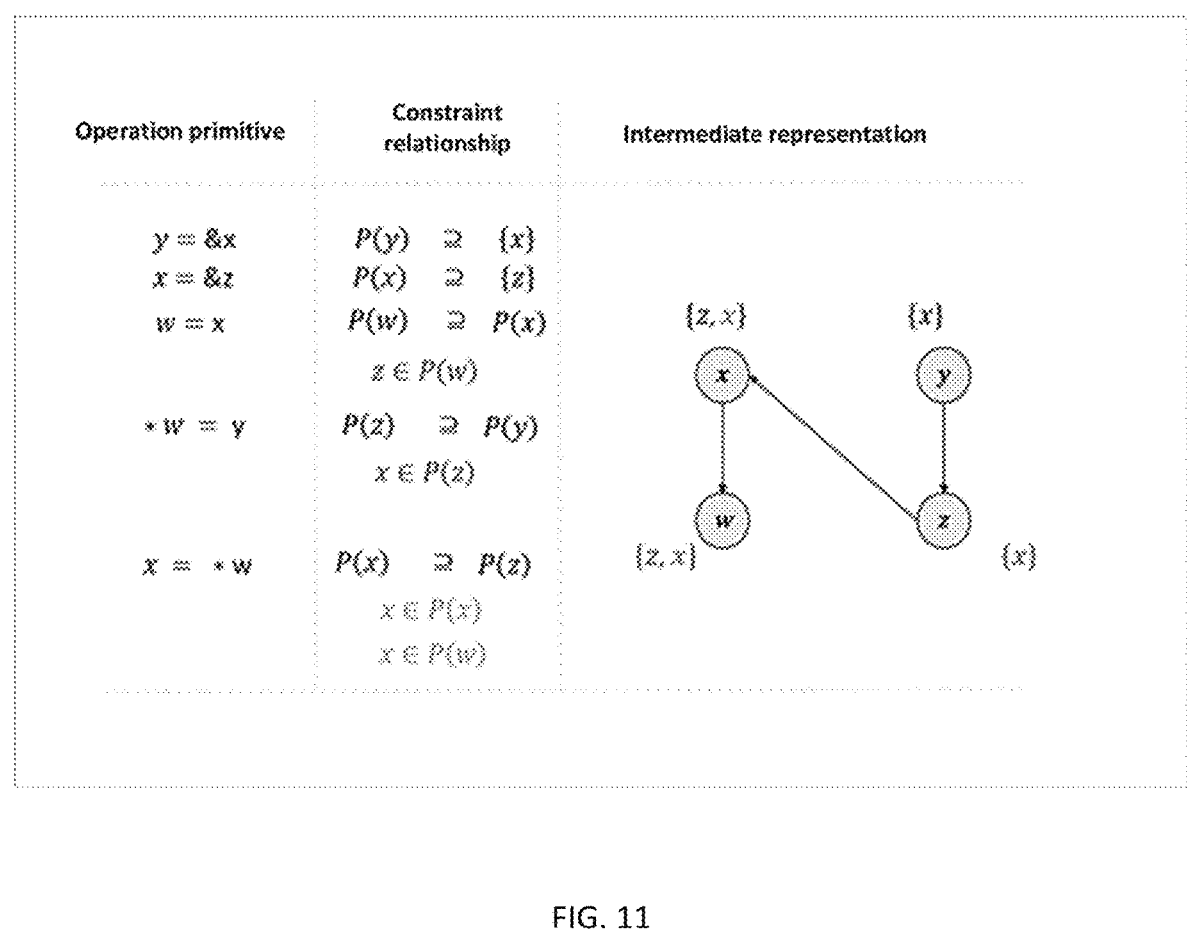

| Operation primitive | Constraint relationship | Intermediate representation |
|---|---|---|
| $y = \&x$ | $P(y) \supseteq \{x\}$ | |
| $x = \&z$ | $P(x) \supseteq \{z\}$ | |
| $w = x$ | $P(w) \supseteq P(x)$ | |
| | $z \in P(w)$ | |
| $*w = y$ | $P(z) \supseteq P(y)$ | |
| | $x \in P(z)$ | |
| $x = *w$ | $P(x) \supseteq P(z)$ | |
| | $x \in P(x)$ | |
| | $x \in P(w)$ | |

INTERMEDIATE REPRESENTATION METHOD AND APPARATUS FOR COMPILING COMPUTATION GRAPHS

CROSS-REFERENCE TO RELATED APPLICATIONS

This application claims priority to and benefits of Chinese Patent Application No. 202211177783.1, filed with the China National Intellectual Property Administration on Sep. 27, 2022, and entitled "Intermediate Representation Method and Apparatus for Compiling Computation Graphs", the entire content of which is incorporated herein by reference.

TECHNICAL FIELD

The disclosure relates to the field of computer systems based on specific computational models, in particular to an intermediate representation method and apparatus for compiling computation graphs.

BACKGROUND

With the development of neural network models in recent years, techniques for compiling computation graphs of neural network models have become increasingly important. At present, among the existing graph compilation techniques for neural network computation, there is still no compilation technique that analyzes the tensor variables pointing to the same memory address in computation graph Therefore, the existing compilation techniques have a high demand on hardware memory resources.

SUMMARY

An objective of the disclosure is to provide an intermediate representation method and apparatus for compiling computation graphs to overcome the defects in the prior art.

In order to realize the above objective, the disclosure provides the following technical solution:

the disclosure discloses an intermediate representation method for compiling computation graphs, including the following steps:

step 1: compiling a neural network into a computation graph for neural network computation on a computer;

step 2: constructing a node for each tensor variable in the computation graph;

step 3: associating the node representing the tensor variable in the computation graph to a set of pointers to the tensor variable;

step 4: analyzing constraint relationships between the tensor variables in the computation graph, including the following substeps:

step 4.1: defining a constraint representation of an address assignment operation between the tensor variables in the computation graph;

step 4.2: defining a constraint representation of an assignment operation between the tensor variables in the computation graph;

step 4.3: defining a constraint representation of a load operation of the set of pointers to the tensor variable in the computation graph; and step 4.4: defining a constraint representation of a store operation of the set of pointers to the tensor variable in the computation graph;

step 5: iteratively constructing a topological graph of the intermediate representation based on the constraint relationships between the tensor variables in the computation graph, including the following substeps:

step 5.1: constructing a propagation process of the intermediate representation of the computation graph based on the constraint representation of the assignment operation between the tensor variables;

step 5.2: constructing a loading process of the set of pointers to the tensor variable in the intermediate representation of the computation graph based on the constraint representation of the load operation of the set of pointers to the tensor variable; and step 5.3: constructing a storage process of the set of pointers to the tensor variable in the intermediate representation of the computation graph based on the constraint representation of the store operation of the set of pointers to the tensor variable; and step 6: analyzing the tensor variables with different aliases pointing to a same memory location based on the intermediate representation, and allocating a register for the tensor variables with different aliases.

Preferably, defining the constraint representation of the address assignment operation between the tensor variables in the computation graph in step 4.1 refers to a constraint representation method of assigning an address of the tensor variable b to the tensor variable a, specifically including: if the tensor variable b and the tensor variable a have a relationship that the address of the tensor variable b is assigned to the tensor variable a, then defining that the tensor variable b and the tensor variable a have a basic constraint relationship: the set containing the tensor variable b is contained in the set of pointers to the tensor variable a.

Preferably, defining the constraint representation of the assignment operation between the tensor variables in the computation graph in step 4.2 refers to a constraint representation method of assigning the tensor variable b to the tensor variable a, specifically including: if the tensor variable b and the tensor variable a have a relationship that the tensor variable b is assigned to the tensor variable a, then defining that the tensor variable b and the tensor variable a have a constraint relationship of the assignment operation: the set of pointers to the tensor variable b is contained in the set of pointers to the tensor variable a.

Preferably, defining the constraint representation of the load operation of the set of pointers to the tensor variable in the computation graph in step 4.3 refers to a constraint representation method of loading an element in the set of pointers to the tensor variable b to the set of pointers to the tensor variable a, specifically including: if the tensor variable a and the tensor variable b satisfy that the element in the set of pointers to the tensor variable b is assigned to the tensor variable a and the set of pointers to the tensor variable b contains a tensor variable t element, then defining that the tensor variables a and b have a constraint relationship: the constraint relationship of the operation of loading the set of pointers to the tensor variable b to the set of pointers to the tensor variable a is defined as that a set of pointers to the tensor variable t is contained in the set of pointers to the tensor variable a.

Preferably, defining the constraint representation of the store operation of the set of pointers to the tensor variable in the computation graph in step 4.4 refers to a constraint representation method of storing the set of pointers to the tensor variable b into a set of pointers to an element in the set of pointers to the tensor variable a, specifically including: if the tensor variable b and the tensor variable a satisfy that: the set of pointers to the tensor variable b is assigned to the element of the set of pointers to the tensor variable a and the set of pointers to the tensor variable a contains a tensor variable t element, then it is defined that the tensors a and b have a constraint relationship: the constraint relationship of storing the set of pointers to the tensor variable b into the set of pointers to the element in the set of pointers to the tensor variable a is defined as that the set of pointers to the tensor variable b is contained in the set of pointers to the element tin the set of pointers to the tensor variable a.

Preferably, step 5.1 means that the set containing the tensor variable propagates along a direction of an edge of the computation graph based on the constraint representation, specifically including the following substeps:

step 5.1.1: constructing an intermediate representation of the assignment operation in the computation graph: for the constraint representation of the assignment operation in the computation graph, if the tensor variable b and the tensor variable a have a relationship that the tensor variable b is assigned to the tensor variable a, then the tensor variable b and the tensor variable a have a constraint representation: the set of pointers to the tensor variable b is contained in the set of pointers to the tensor variable a;

step 5.1.2: constructing the topological graph based on the constraint representation of the assignment operation, specifically including: for the constraint relationship that the set of pointers to the tensor variable b is contained in the set of pointers to the tensor variable a, generating an edge from the node of the set of pointers to the tensor variable b to the node of the set of pointers to the tensor variable a in the topological graph based on the constraint relationship; and the propagation process of the tensor variables of the assignment operation in the topological graph includes: an execution flow of the computation graph passes through a constraint relationship edge representing the assignment operation, then the constraint relationship edge propagates from the node of the set of pointers to the tensor variable b to the node of the set of pointers to the tensor variable a, and the pointer of the end node of the constraint relationship also points to the set containing the tensor variable that the pointer of the start node of the constraint relationship edge points to.

Preferably, step 5.2 means that the element in the set of pointers to the tensor variable b is loaded into the set of pointers to the tensor variable a, and the element in the set of pointers to the tensor variable b propagates along a direction of an edge of the computation graph based on the constraint representation, specifically including the following substeps:

step 5.2.1: constructing an intermediate representation of the load operation in the computation graph: for the constraint representation of the load operation in the computation graph, if the tensor variable b and the tensor variable a have a relationship that the element in the set of pointers to the tensor variable b is assigned to the tensor variable a and the set of pointers to the tensor variable b contains the tensor variable t element, then the constraint representation of the operation of loading the set of pointers to the tensor variable b to the set of pointers to the tensor variable a represents that the set of pointers to the tensor variable t is contained in the set of pointers to the tensor variable a;

step 5.2.2: constructing the topological graph based on the constraint representation of the load operation, specifically including: for the constraint relationship that the set of pointers to the tensor variable t element in the set of pointers to the tensor variable b is contained in the set of pointers to the tensor variable a, an edge from the node of the set of pointers to the tensor variable t to the node of the set of pointers to the tensor variable a is generated in the topological graph based on the constraint relationship; and the propagation process of the tensor variables of the load operation in the topological graph includes: an execution flow of the computation graph passes through a constraint relationship edge representing the load operation, and then the constraint relationship edge propagates from the node of the set of pointers to the corresponding element to the node of the set of pointers to the tensor variable a.

Preferably, step 5.3 means that the set of pointers to the tensor variable b is stored into the set of pointers to the element in the set of pointers to the tensor variable a, and the set of pointers to the tensor variable b propagates along a direction of an edge of the computation graph based on the constraint representation, specifically including the following substeps:

step 5.3.1: constructing an intermediate representation of the store operation in the computation graph: for the constraint representation of the store operation in the computation graph, if the tensor variable b and the tensor variable a have a relationship that the set of pointers to the tensor variable b is assigned to the element of the set of pointers to the tensor variable a and the set of pointers to the tensor variable a contains the tensor variable t element, then the constraint representation of storing the set of pointers to the tensor variable b into the set of pointers to the element in the set of pointers to the tensor variable a represents that the set of pointers to the tensor variable b is contained in the set of pointers to the element tin the set of pointers to the tensor variable a;

step 5.3.2: constructing the topological graph based on the constraint representation of the store operation, specifically including: for the constraint relationship that the set of pointers to the tensor variable b is contained in the set of pointers to the tensor variable t, generating an edge from the node of the set of pointers to the tensor variable b to the node of the set of pointers to the tensor variable tin the topological graph based on the constraint relationship; and the propagation process of the tensor variables of the store operation in the topological graph includes: an execution flow of the computation graph passes through a constraint relationship edge representing the store operation, and then the constraint relationship edge propagates from the node of the set of pointers to the tensor variable b to the node of the set of pointers to the corresponding element tin the set of pointers to the tensor variable a.

Preferably, step 6 specifically includes: if it is found that the set of pointers to a certain tensor variable in the topological graph of the intermediate representation contains tensor variables with different aliases, considering the tensor variables with different aliases as the same tensor variable because of the same memory address, and allocating a same idle register for the tensor variables with different aliases.

Of course, before step 1, a step of inputting the neural network model into the computer may be included in the method; after step 6, a step of generating executable codes of the neural network model according to optimized computation graphs may be included in the method.

The disclosure discloses an intermediate representation apparatus for compiling computation graphs, including an input device, an output device, and a data processing unit, the data processing unit includes a memory and one or more processors. The memory has an executable code stored therein, and the one or more processors are configured to implement the intermediate representation method for compiling computation graphs above when executing the executable code. The input device is configured to input the neural network model to the data processing unit, the output device is configured to generate executable codes of the neural network model according to optimized computation graphs.

The disclosure has the following beneficial effects: the intermediate representation method and apparatus for compiling computation graphs provide a method for analyzing the tensor variables having an alias relationship that point to the same memory location in the computation graph. The tensor variables having an alias relationship that point to the same memory location in the computation graph are analyzed and stored in the same register. The intermediate representation method for compiling computation graphs provided by the disclosure optimizes the compilation efficiency of the tensor variables pointing to the same memory location in the computation graph, lowers the demand on the hardware memory resources during the execution of the computation graph and improves the execution efficiency of the computation graph during execution. In the process of developing algorithm models, researchers and engineering users can optimize the model by using the intermediate representation method and apparatus for compiling computation graphs, which improves the compilation efficiency of the computation graph and promotes the development of the application of deep neural network models.

BRIEF DESCRIPTION OF FIGURES

FIG. 9 is a schematic diagram of an intermediate representation of an assignment operation according to an embodiment of the disclosure;

FIG. 10 is a schematic diagram of an intermediate representation of a store operation according to an embodiment of the disclosure;

FIG. 11 is a schematic diagram of an intermediate representation of a load operation according to an embodiment of the disclosure;

DETAILED DESCRIPTION

In order to make the objectives, technical solutions and advantages of the disclosure more clear, the disclosure will be further described in detail below with reference to the accompanying drawings and embodiments. However, it should be understood that the specific embodiments described here are only intended to explain the disclosure, and not to limit the scope of the disclosure. In addition, in the description, the descriptions of well-known structures and technologies are omitted to avoid unnecessary confusion about the concepts of the disclosure.

Figure 13:
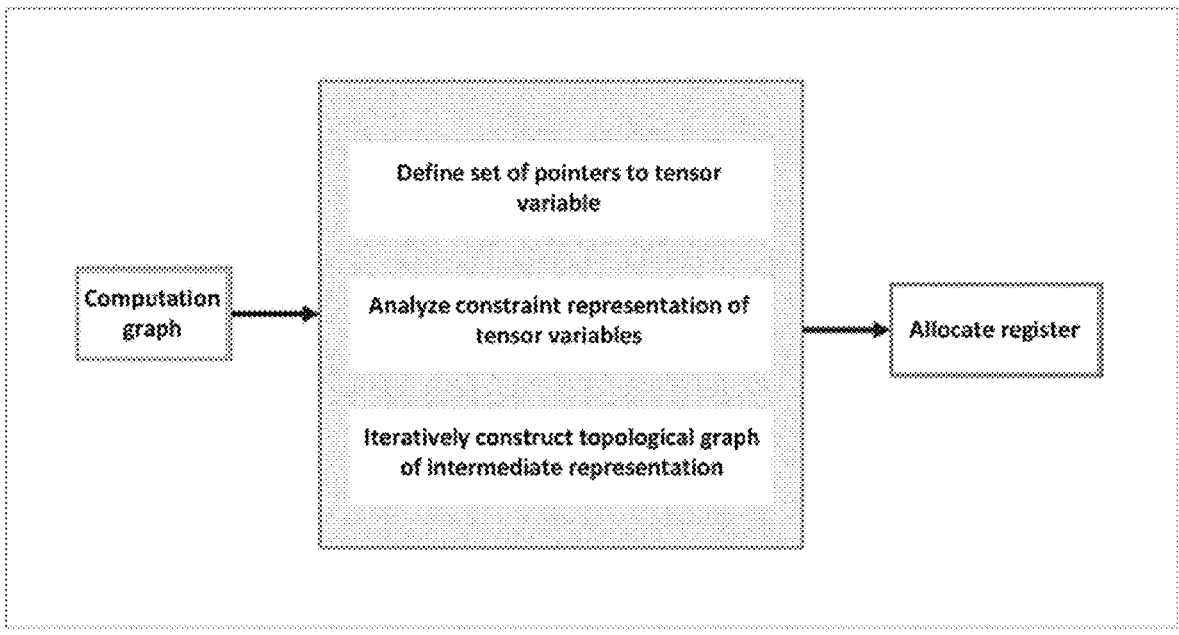
FIG. 13 is a schematic diagram of an overall architecture of an intermediate representation method according to an embodiment of the disclosure.

An embodiment of the disclosure provides an intermediate representation method for compiling computation graphs. The architecture diagram of the intermediate representation method is shown in FIG. 13. The method includes the following steps:

step 1: a neural network is compiled into a computation graph for neural network computation;

step 2: a node is constructed for each tensor variable v in the computation graph;

step 3: the node representing the tensor variable v in the computation graph is associated to a set of pointers P(v) to the tensor variable v;

step 4: constraint relationships between the tensor variables in the computation graph are analyzed, including the following substeps:

step 4.1: a constraint representation of an address assignment operation between the tensor variables in the computation graph is defined;

step 4.2: a constraint representation of an assignment operation between the tensor variables in the computation graph is defined;

step 4.3: a constraint representation of a load operation of the set of pointers to the tensor variable in the computation graph is defined; and step 4.4: a constraint representation of a store operation of the set of pointers to the tensor variable in the computation graph is defined;

step 5: a topological graph of the intermediate representation is iteratively constructed based on the constraint relationships between the tensor variables in the computation graph, including the following substeps:

step 5.1: a propagation process of the intermediate representation of the computation graph is constructed based on the constraint representation of the assignment operation between the tensor variables;

step 5.2: a loading process of the set of pointers to the tensor variable in the intermediate representation of the computation graph is constructed based on the constraint representation of the load operation of the set of pointers to the tensor variable; and step 5.3: a storage process of the set of pointers to the tensor variable in the intermediate representation of the computation graph is constructed based on the constraint representation of the store operation of the set of pointers to the tensor variable; and step 6: the tensor variables with different aliases pointing to a same memory location is analyzed based on the intermediate representation, and a register is allocated for the tensor variables with different aliases.

Figure 1:
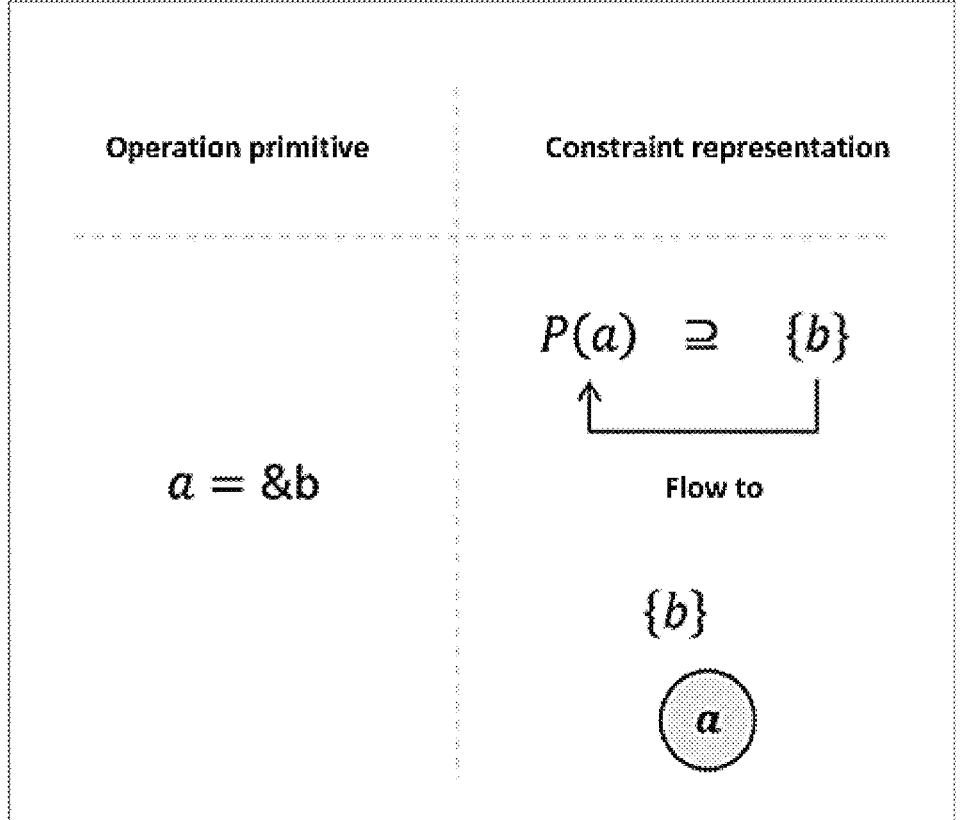
FIG. 1 is a schematic diagram of a constraint representation of an address assignment operation in a computation graph according to an embodiment of the disclosure.

In step 4.1, the constraint representation of the address assignment operation between the tensor variables in the computation graph is defined. Defining the constraint representation of the address assignment operation between the tensor variables in the computation graph refers to a constraint representation method of assigning an address of the tensor variable b to the tensor variable a. If the tensor variable b and the tensor variable a have a relationship that the address of the tensor variable b is assigned to the tensor variable a, i.e., a=&b, then it is defined that the tensor variable b and the tensor variable a have a basic constraint relationship: the set containing the tensor variable b is contained in the set of pointers to the tensor variable a. The constraint representation of the address assignment operation is $P(a) \supseteq (b)$. FIG. 1 shows a constraint representation process of the address assignment operation in the computation graph.

Figure 2:
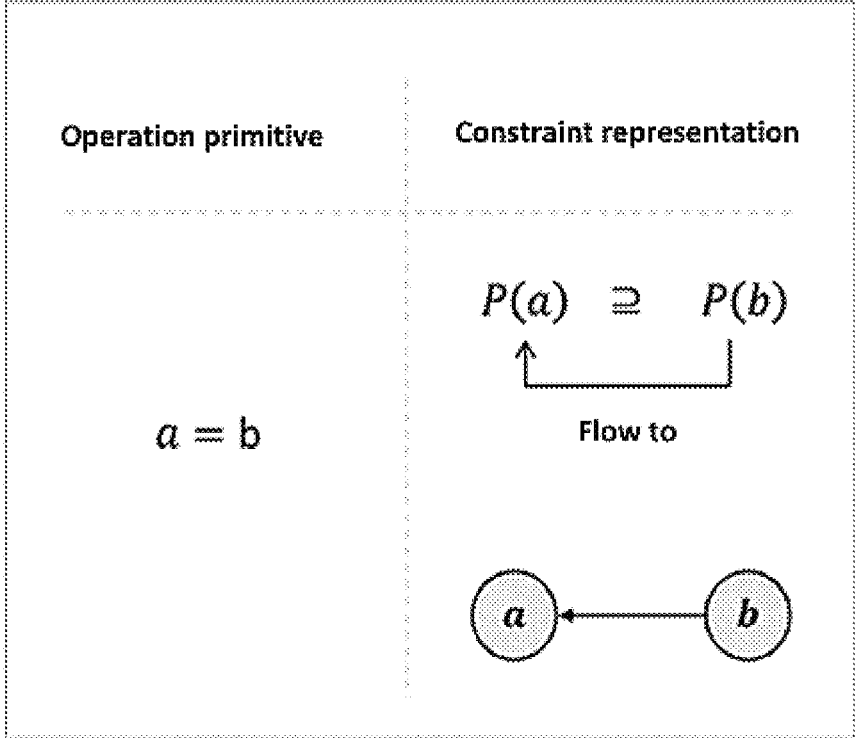
FIG. 2 is a schematic diagram of a constraint representation of an assignment operation according to an embodiment of the disclosure.

In step 4.2, the constraint representation of the assignment operation in the computation graph is defined. Defining the constraint representation of the assignment operation between the tensor variables in the computation graph refers to a constraint representation method of assigning the tensor variable b to the tensor variable a. If the tensor variable b and the tensor variable a have a relationship that the tensor variable b is assigned to the tensor variable a, i.e., a=b, then it is defined that the tensor variable b and the tensor variable a have a constraint relationship of the assignment operation: the set of pointers to the tensor variable b is contained in the set of pointers to the tensor variable a. The constraint representation of the assignment operation is $P(a) \supseteq P(b)$. FIG. 2 shows a constraint representation process of the assignment operation in the computation graph.

Figure 3:
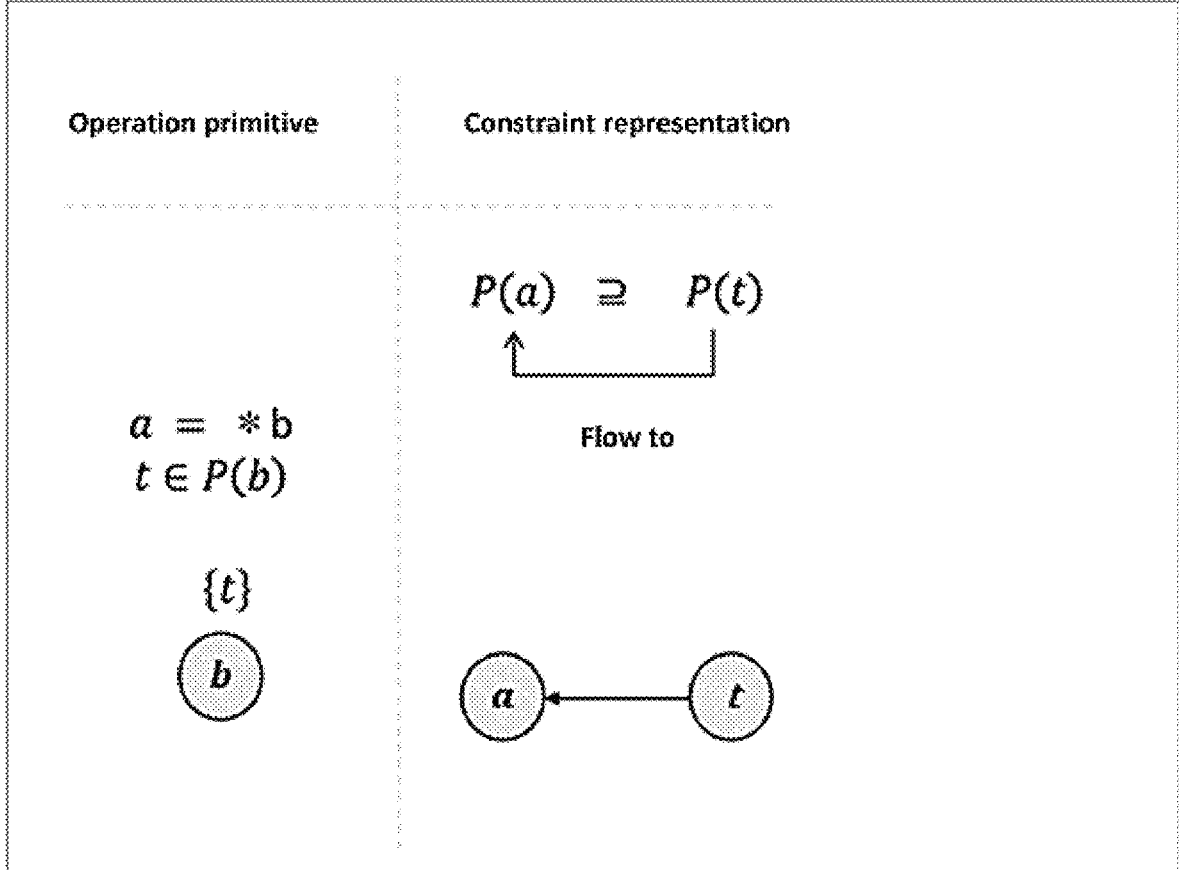
FIG. 3 is a schematic diagram of a constraint representation of a load operation of a set of pointers to a tensor variable according to an embodiment of the disclosure.

In step 4.3, the constraint representation of the load operation of the set of pointers to the tensor variable in the computation graph is defined. The constraint representation of the load operation of the set of pointers to the tensor variable refers to a constraint representation method of loading an element in the set of pointers P(b) to the tensor variable b to the set of pointers P(a) to the tensor variable a. The constraint representation of the load operation includes:

if the tensors a and b satisfy that the element in the set of pointers P(b) to the tensor variable b is assigned to the tensor variable a and the set of pointers to the tensor variable b contains a tensor variable t element, i.e., a=*b and t∈P(b) then it is defined that the tensor variables a and b have a constraint relationship: the constraint relationship of the operation of loading the set of pointers P(b) to the tensor variable b to the set of pointers P(a) to the tensor variable a is defined as that a set of pointers to the tensor variable t is contained in the set of pointers to the tensor variable a: $P(a) \supseteq P(t)$. FIG. 3 shows a constraint representation process of a load operation of a set of pointers to a tensor variable in the computation graph.

Figure 4:
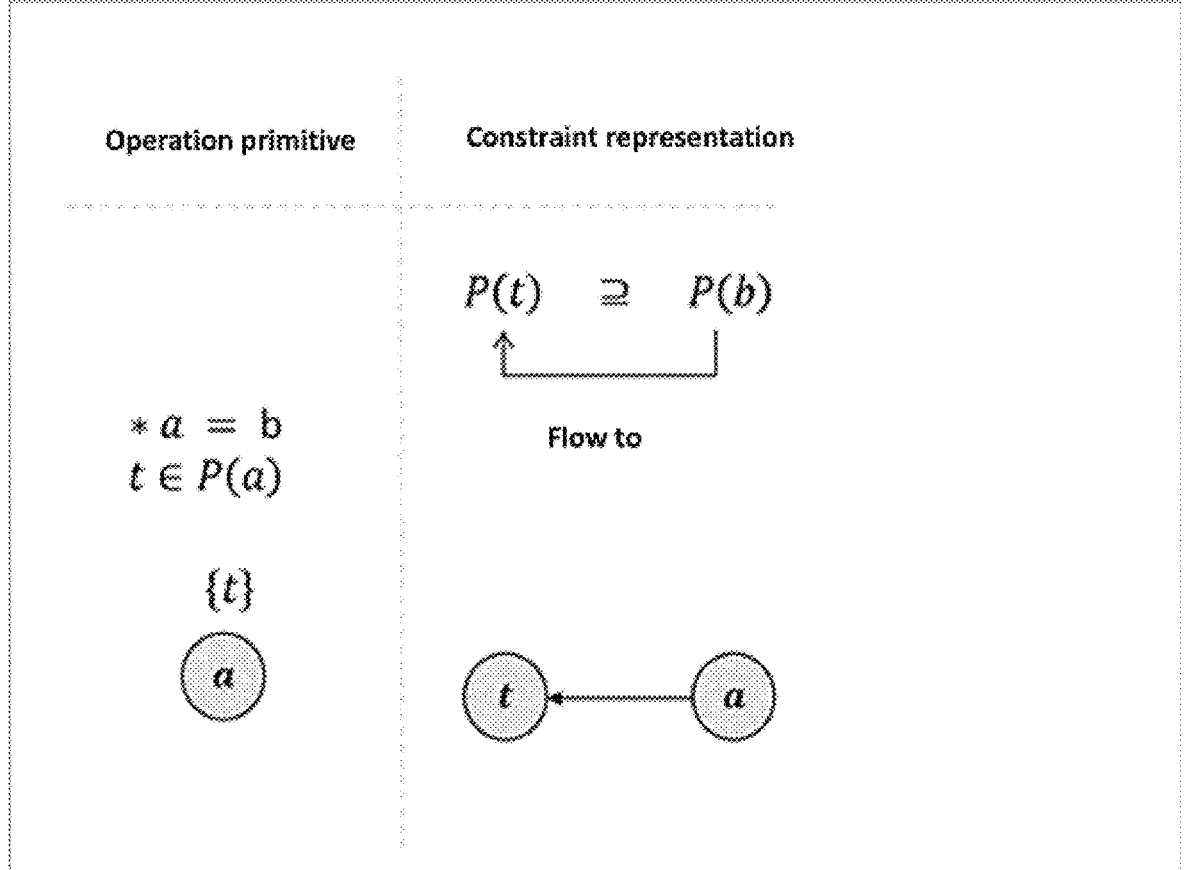
FIG. 4 is a schematic diagram of a constraint representation of a store operation of a set of pointers to a tensor variable according to an embodiment of the disclosure.

In step 4.4, the constraint representation of the store operation of the set of pointers to the tensor variable in the computation graph is defined. The constraint representation of the store operation of the set of pointers to the tensor variable refers to a constraint representation method of storing the set of pointers P(b) to the tensor variable b into a set of pointers to an element in the set of pointers P(a) to the tensor variable a. The constraint relationship of the store operation includes:

if the tensor variable b and the tensor variable a satisfy that: the set of pointers P(b) to the tensor variable b is assigned to the element of the set of pointers to the tensor variable a and the set of pointers to the tensor variable a contains a tensor variable t element, i.e., a=*b and t∈P(a), then the tensors a and b have a constraint relationship: the constraint relationship of storing the set of pointers P(b) to the tensor variable b into the set of pointers to the element in the set of pointers P(a) to the tensor variable a is defined as that the set of pointers to the tensor variable b is contained in the set of pointers P(t) to the element t in the set of pointers to the tensor variable a. The constraint representation of the store operation is the constraint relationship $P(t) \supseteq P(b)$. FIG. 4 shows a constraint representation process of the store operation of the set of pointers to the tensor variable in the computation graph.

In step 5.1, the propagation process of the intermediate representation of the computation graph is constructed. Constructing the propagation process of the intermediate representation of the computation graph means that the set containing the tensor variable propagates along a direction of an edge of the computation graph based on the constraint representation. A modeling process of the propagation process of the intermediate representation is as follows:

(i) Intermediate representation process of computation graph: for the constraint representation of the assignment operation in the computation graph, if the tensor variable b and the tensor variable a have a relationship that the tensor variable b is assigned to the tensor variable a, i.e., a=b, then the tensor variable b and the tensor variable a have a constraint representation: $P(a) \supseteq P(b)$, representing that the set of pointers to the tensor variable b is contained in the set of pointers to the tensor variable a.

(ii) Graph construction process of constraint representation: for the constraint relationship that the set of pointers to the tensor variable b is contained in the set of pointers to the tensor variable a $P(t) \supseteq P(b)$, the graph construction process of the constraint representation means that an edge from the node of the set of pointers P(b) to the tensor variable b to the node of the set of pointers P(a) to the tensor variable a is generated in the topological graph based on the constraint relationship.

Figure 5:
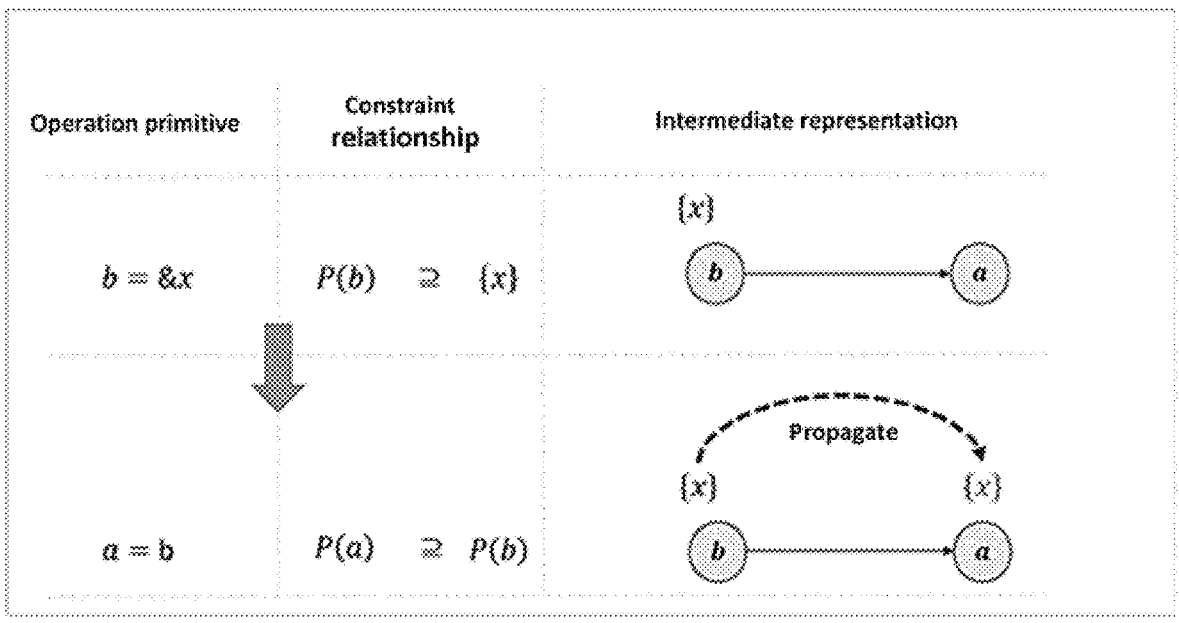
FIG. 5 is a schematic diagram of constructing a propagation process of an intermediate representation of the computation graph according to an embodiment of the disclosure.

(iii) Propagation process of tensor variables: since the set of pointers to the tensor variable b is contained in the set of pointers to the tensor variable a, all tensor elements contained in the set of pointers to the tensor variable b flow to the set of pointers to the tensor variable a. Therefore, as long as an execution flow of the computation graph passes through a constraint relationship edge representing the assignment operation, then the constraint relationship edge propagates from the node of the set of pointers P(b) to the tensor variable b to the node of the set of pointers P(a) to the tensor variable a, that is, the pointer of the end node of the constraint relationship also points to the set containing the tensor variable that the pointer of the start node of the constraint relationship edge points to. FIG. 5 shows a schematic diagram of constructing the propagation process of the intermediate representation of the computation graph.

In step 5.2, the loading process of the set of pointers to the tensor variable in the intermediate representation of the computation graph is constructed. Constructing the loading process of the set of pointers to the tensor variable in the intermediate representation of the computation graph means that the element in the set of pointers P(b) to the tensor variable b is loaded into the set of pointers P(a) to the tensor variable a, and the element in the set of pointers P(b) to the tensor variable b propagates along a direction of an edge of the computation graph based on the constraint representation. A modeling process of the loading process of the intermediate representation is as follows:

(i) Intermediate representation process of computation graph: for the constraint representation of the load operation in the computation graph, if the tensor variable b and the tensor variable a have a relationship that the element in the set of pointers P(b) to the tensor variable b is assigned to the tensor variable a and the set of pointers to the tensor variable b contains the tensor variable t element, i.e., a=*b and t∈P(b), then the constraint representation of the operation of loading the set of pointers P(b) to the tensor variable b to the set of pointers P(a) to the tensor variable a, i.e., P(t)⊇P(b) and t∈P(b) represents that the set of pointers to the (element contained in the set of pointers to the tensor variable b) t∈P(b) tensor variable t is contained in the set of pointers to the tensor variable a.

(ii) Graph construction process of constraint representation: for the constraint relationship that the set of pointers to the (element contained in the set of pointers to the tensor variable b t∈P(b) tensor variable t is contained in the set of pointers to the tensor variable a, i.e., P(a)⊇P(t) and t∈P(b), the graph construction process of the constraint representation means that an edge from the node of the set of pointers to the tensor variable t to the node of the set of pointers to the tensor variable a is generated in the topological graph based on the constraint relationship.

Figure 6:
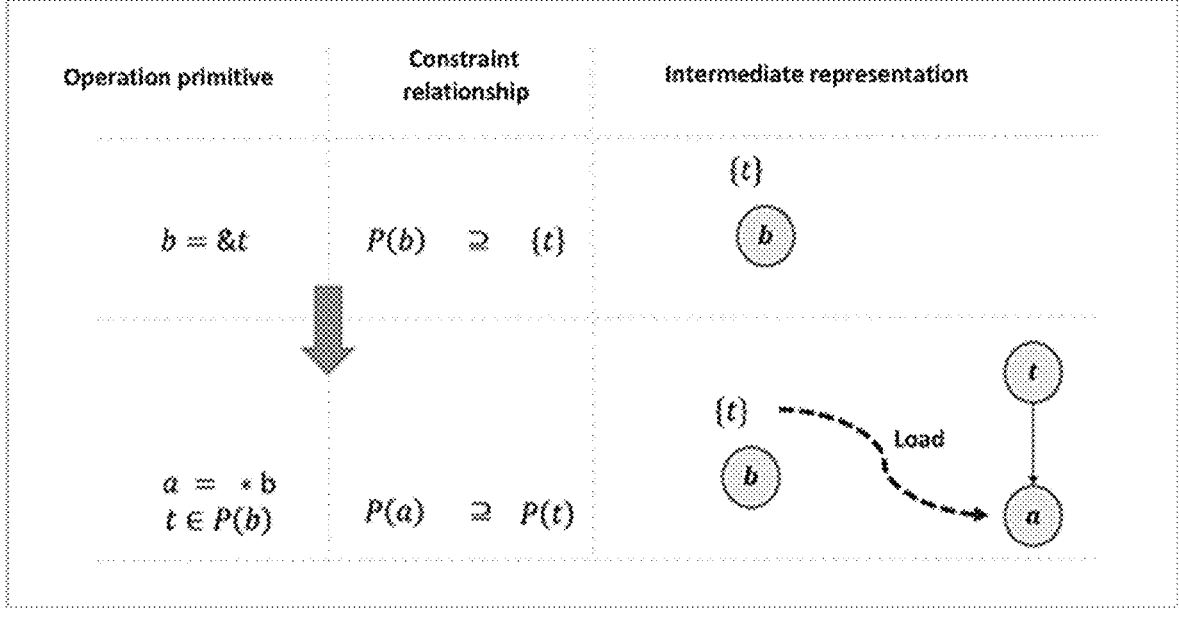
FIG. 6 is a schematic diagram of constructing a loading process of the set of pointers to the tensor variable in the intermediate representation of the computation graph according to an embodiment of the disclosure.

(iii) Propagation process of tensor variables: since the set of pointers to the (element contained in the set of pointers to the tensor variable b t∈P(b) tensor variable t is contained in the set of pointers to the tensor variable a, i.e., P(a)⊇P(t) and t∈P(b), the sets of pointers to all tensor elements contained in the set of pointers to the tensor variable b flow to the set of pointers to the tensor variable a. Therefore, as long as an execution flow of the computation graph passes through a constraint relationship edge representing the load operation, then the constraint relationship edge propagates from the node of the set of pointers P(t) to the corresponding element to the node of the set of pointers P(a) to the tensor variable a. FIG. 6 shows a schematic diagram of constructing the loading process of the set of pointers to the tensor variable in the intermediate representation of the computation graph.

In step 5.3, the storage process of the set of pointers to the tensor variable in the intermediate representation of the computation graph is constructed. Constructing the storage process of the set of pointers to the tensor variable in the intermediate representation of the computation graph means that the set of pointers P(b) to the tensor variable b is stored into the set of pointers to the element in the set of pointers P(a) to the tensor variable a, and the set of pointers P(b) to the tensor variable b propagates along a direction of an edge of the computation graph based on the constraint representation. A modeling process of the storage process of the intermediate representation is as follows:

(i) Intermediate representation process of computation graph: for the constraint representation of the store operation in the computation graph, if the tensor variable b and the tensor variable a have a relationship that the set of pointers P(b) to the tensor variable b is assigned to the element of the set of pointers to the tensor variable a and the set of pointers to the tensor variable a contains the tensor variable t element, i.e., *a=b and t∈P(a), then the constraint representation of storing the set of pointers P(b) to the tensor variable b into the set of pointers to the element in the set of pointers P(a) to the tensor variable a, i.e., P(t)⊇P(b), represents that the set of pointers to the tensor variable b is contained in the set of pointers P(t) to the element tin the set of pointers to the tensor variable a.

(ii) Graph construction process of constraint representation: for the constraint relationship that the set of pointers to the tensor variable b is contained in the set of pointers to the (element contained in the set of pointers to the tensor variable a t∈P(a) tensor variable t, i.e., P(t)⊇P(b) and t∈P(a), the graph construction process of the constraint representation means that an edge from the node of the set of pointers to the tensor variable b to the node of the set of pointers to the tensor variable t is generated in the topological graph based on the constraint relationship.

Figures 7, 8:
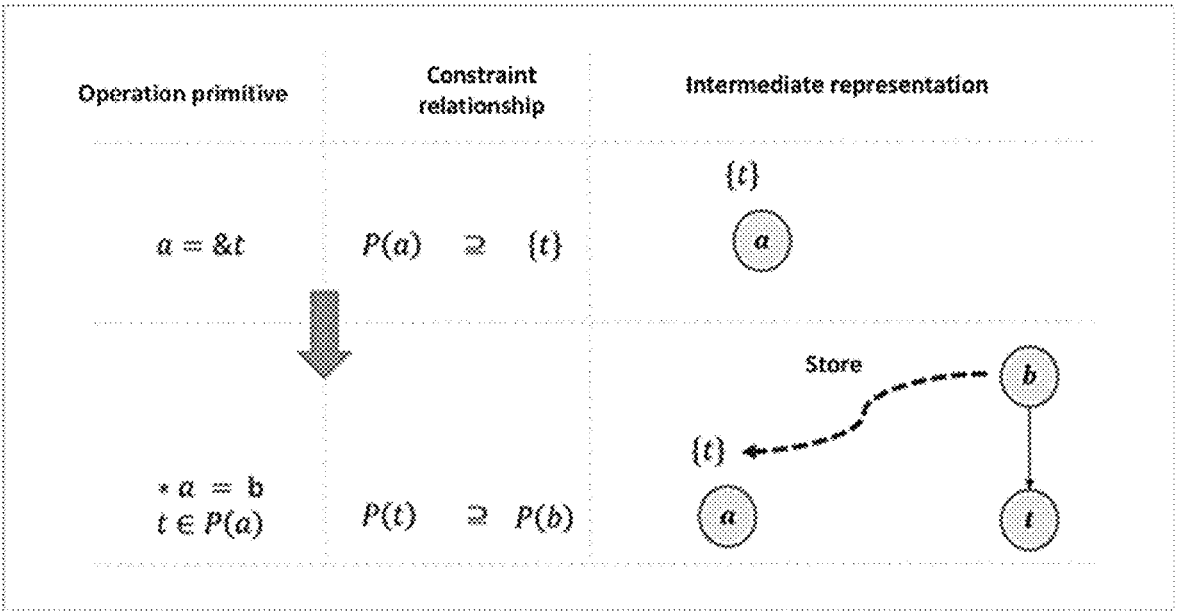
FIG. 7 is a schematic diagram of constructing a storage process of the set of pointers to the tensor variable in the intermediate representation of the computation graph according to an embodiment of the disclosure.
FIG. 8 is a schematic diagram of an intermediate representation of an address assignment operation according to an embodiment of the disclosure.

(iii) Propagation process of tensor variables: since the set of pointers to the tensor variable b is contained in the set of pointers to the (element contained in the set of pointers to the tensor variable a t∈P(a) tensor variable t, i.e., P(t)⊇P(b) and t∈P(a), the node of the set of pointers to the tensor variable b flows to the node of the set of pointers to the tensor variable t. Therefore, as long as an execution flow of the computation graph passes through a constraint relationship edge representing the store operation, then the constraint relationship edge propagates from the node of the set of pointers P(b) to the tensor variable b to the node of the set of pointers P(t) to the corresponding element tin the set of pointers to the tensor variable a. FIG. 7 shows a schematic diagram of constructing the storage process of the set of pointers to the tensor variable in the intermediate representation of the computation graph.

Step 6 specifically includes: if it is found that the set of pointers to a certain tensor variable in the topological graph of the intermediate representation contains tensor variables with different aliases, the tensor variables with different aliases are considered as the same tensor variable because of the same memory address, and a same idle register is allocated for the tensor variables with different aliases.

Specifically, the process of the intermediate representation method for compiling computation graphs is as follows: Step one: for each tensor variable in the computation graph, a node associated with a set of pointers to the tensor variable is constructed. The computation graph is shown below:

y=&x;
x=&z;
w=x;
*w=y; and
x=*w.

The operations in the computation graph have the following meanings:

b=&a: represents that the pointer variable b points to the address of the tensor variable a, where &a represents taking the memory address of the tensor variable a.

b=a: represents that the pointer variable b points to the tensor variable a.

*b=a: represents that an element of the pointer variable b points to the tensor variable a.*b represents taking the dereference of the pointer to the tensor variable b, i.e., acquiring the element contained in the set of pointers to the tensor variable b.

b=*a: represents that the pointer variable b points to an element of the pointer variable a.

Step two: constraint relationships between the tensor variables in the computation graph are analyzed.

$$y=\&x\rightarrow P(y)\supseteq(x)$$

$$x=\&z\rightarrow P(x)\supseteq(z)$$

$$w=x\rightarrow P(w)\supseteq P(x)$$

$$*w=y\rightarrow t\in P(t) \text{ and } P(t)\supseteq P(y);$$

$$x=*w\rightarrow t\in P(w) \text{ and } P(x)\supseteq P(t)$$

where the constraint relationships between the tensor variables in the computation graph have the following meanings:

(1) Address assignment operation a=&b→P(a)⊇(b): if the tensor variable b and the tensor variable a have a relationship that the address of the tensor variable b is assigned to the tensor variable a, i.e., a=&b, then it is defined that the tensor variable b and the tensor variable a have a basic constraint relationship: the set {b} containing the tensor variable b is contained in the set of pointers P(a) to the tensor variable a, i.e., P(a)⊇{b}.

(2) Assignment operation a=b→P(a)⊇P(b): if the tensor variable b and the tensor variable a have a relationship that the tensor variable b is assigned to the tensor variable a, i.e., a=b, then it is defined that the tensor variable b and the tensor variable a have a constraint relationship of the assignment operation: the set of pointers P(b) to the tensor variable b is contained in the set of pointers P(a) to the tensor variable a, i.e., P(a)⊇P(b).

(3) Store operation a=*b→t∈P(b) and P(a)⊇P(t): The set of pointers to the tensor variable a contains the tensor variable t element, and the set of pointers P(b) to the tensor variable b is assigned to the element t in the set of pointers to the tensor variable a, i.e., *a=b and t∈P(a). Then the tensors a and b have a constraint relationship: the constraint relationship of storing the set of pointers P(b) to the tensor variable b into the set of pointers P(t) to the element t in the set of pointers P(a), to the tensor variable a is defined as that the set of pointers P(b) to the tensor variable b is contained in the set of pointers P(t) to the element t in the set of pointers to the tensor variable a, i.e., P(t)⊇P(b) and t∈P(a).

(4) Load operation a=*b→t∈P(b) and P(a)⊇P(t): the set of pointers to the tensor variable b contains the tensor variable t element, i.e., t∈P(b), and the element t in the set of pointers P(b) to the tensor variable b is assigned to the tensor variable a, i.e., a=*b and t∈P(b). Then the tensor variables a and b have a constraint relationship: the constraint relationship of the operation of loading the set of pointers P(b) to the tensor variable b to the set of pointers P(a) to the tensor variable a is defined as that the set of pointers P(t) to the element t contained in the set of pointers to the tensor variable b is contained in the set of pointers to the tensor variable a, i.e., P(a)⊇P(t) and t∈P(b).

Step three: a topological graph of the intermediate representation is iteratively constructed based on the constraint relationships between the tensor variables in the computation graph. Iteratively constructing the topological graph of the intermediate representation based on the constraint relationships between the tensor variables in the computation graph means to iteratively construct the topological graph of the intermediate representation according to the constraint relationships between the tensor variables in the computation graph until the structure of the topological graph of the intermediate representation no longer changes.

Construction of topological graph of intermediate representation by first round of iteration: the construction of the topological graph of the intermediate representation by the first round of iteration includes the following processes:

(1) Construction of intermediate representation of address assignment operation: through the analysis based on the address assignment operation y=&x and x=&z, it is concluded that the tensor variables x, y and z have constraint relationships P(y)⊇{x}, P(x)⊇{z}. Therefore, a topological structure that the set containing the tensor variable x is contained in the node of the set of pointers to the tensor variable y is constructed, and similarly, a topological structure that the set containing the tensor variable z is contained in the node of the set of pointers to the tensor variable x is constructed. FIG. 8 shows the intermediate representation process of the address assignment operation.

(2) Construction of intermediate representation of assignment operation: through the analysis based on the assignment operation w=x, it is concluded that the tensor variables x and w have a constraint relationship P(w)⊇P(w). Therefore, a topological structure that the node of the set of pointers to the tensor variable x is contained in the node of the set of pointers to the tensor variable w is constructed, that is, execution flow information flows from the node of the set of pointers to the tensor variable x to the node of the set of pointers to the tensor variable w.

(3) Propagation process of tensor variables of assignment operation: after the assignment operation, the set {z} containing the tensor variable z is propagated to the node of the set of pointers P(w) to the tensor variable w, so there exists P(w)⊇{z}. FIG. 9 shows the intermediate representation process of the assignment operation.

(4) Construction of intermediate representation of store operation: through the analysis based on the store operation *w=y, since the node of the set of pointers P(w) to the tensor variable w contains the {z} element, it is concluded that the node of the set of pointers to the tensor variable y flows to the node of the set of pointers to the tensor variable z, P(z)⊇P(y) and z∈P(w).

(5) Propagation process of tensor variables of store operation: after the store operation, the node of the set of pointers P(y) to the tensor variable y flows to the node of the set of pointers P(z) to the tensor variable z. Because of x∈P(y) (the node of the set of pointers to the tensor variable y contains the element tensor variable x), the set {x} containing the tensor variable x also propagates from the node P(y) to the node P(z), thus obtaining a x∈P{z}. FIG. 10 shows the intermediate representation process of the store operation.

(6) Construction of intermediate representation of load operation: through the analysis based on the store operation x=*w, since the node of the set of pointers P(w) to the tensor variable w contains the {z} element, it is concluded that the node of the set of pointers to the tensor variable z flows to the node of the set of pointers to the tensor variable x, P(x)⊇P(z) and 2∈P(w).

(7) Propagation process of tensor variables of load operation: after the load operation, the node of the set of pointers P(z) to the tensor variable z flows to the node of the set of pointers P(x) to the tensor variable x. Because of x∈P(z) and P(w)⊇P(x) (the node of the set of pointers to the tensor variable x), the set {x} containing the tensor variable x also propagates from the node P(z) to the node P(x), and then to the node P(w), thus obtaining x∈P(x) and x∈P(w). FIG. 11 shows the intermediate representation process of the load operation.

Construction of topological graph of intermediate representation by second round of iteration: the construction of the topological graph of the intermediate representation by the second round of iteration includes the following process: since the first round of iteration adds the element x to the node of the pointers P(x) to the tensor variable x and adds the element x to the node of the pointers P(w) to the tensor variable w, computing operations about *x and *w related to the participation of P(x) and P(w) need to be updated iteratively. Since there are only operations related to the participation of *w in the computation graph, operations *w=y and x=*w need to be updated.

(i) For the operation x=*w: after the first round of iteration, since P(w) is updated to P(w)⊇P{z,x}, the operation primitive related to the participation of the node of the set of pointers P(w) to the tensor variable w is updated to: according to the store operation x=*w, the update of the constraint relationship of the node of the set of pointers P(w) to the tensor variable w only adds x∈P(w), thus obtaining P(x)⊇P(x) and x∈P(w) and since P(x)⊇P(x) represents that the node of the set of pointers P(x) to the tensor variable x flows to its own node, the structural diagram of the intermediate representation does not need to be updated.

Figure 12:
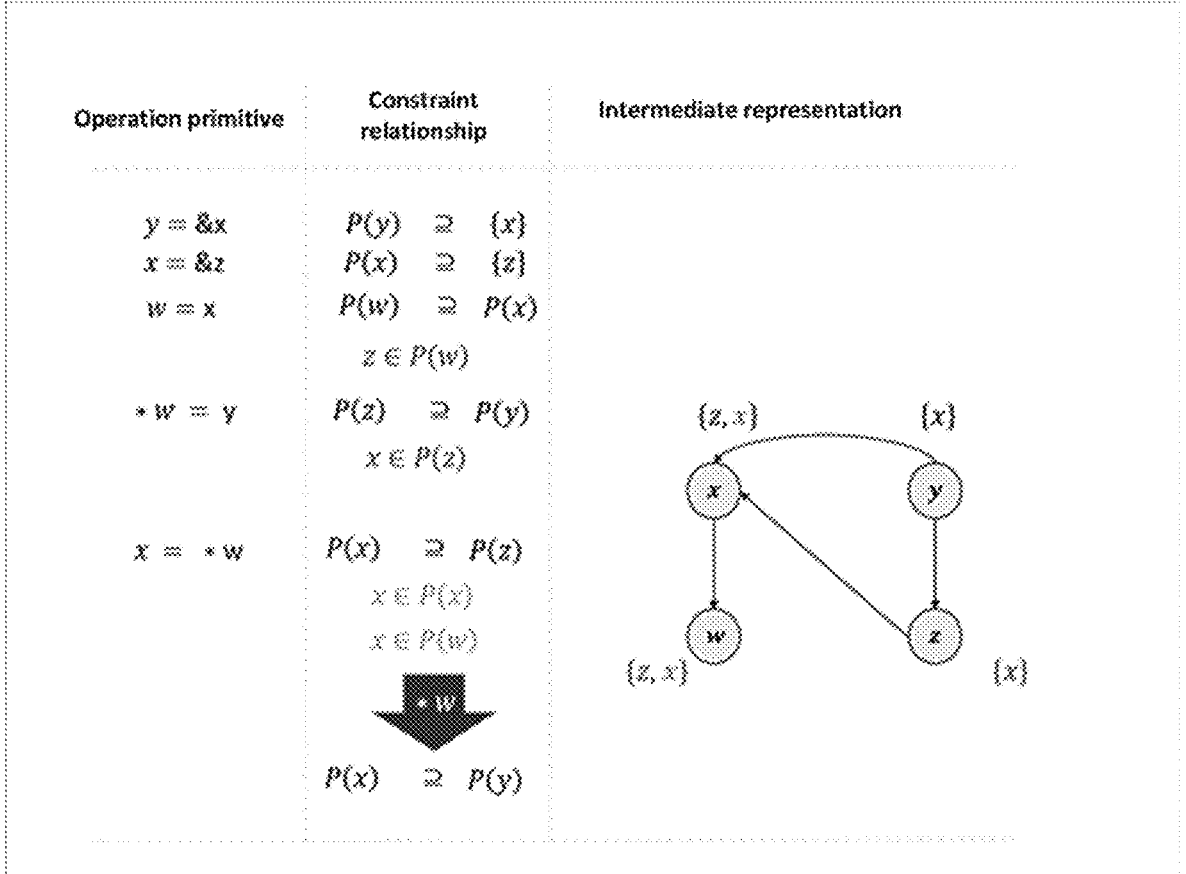
FIG. 12 is a schematic diagram of an intermediate representation of a load operation according to an embodiment of the disclosure.

(ii) For the operation *w=y: after the first round of iteration, since P(w) is updated to P(w)⊇{z,x}, the operation primitive related to the participation of the node of the set of pointers P(y) to the tensor variable y is updated to: according to the store operation *w=y, the update of the constraint relationship of the node of the set of pointers P(w) to the tensor variable w only adds x∈P(w), thus obtaining P(x)⊇P(y) and x∈P(w), and since P(x)⊇P(y) represents that the node of the set of pointers P(y) to the tensor variable y flows to the node of the set of pointers P(x) to the tensor variable x, the structural diagram of the intermediate representation is updated to: need to add an edge that propagates from the node of the set of pointers P(y) to tensor variable y to the node of the set of pointers P(x) to tensor variable x. FIG. 12 shows the intermediate representation process of the load operation.

After the topological graph of the intermediate representation is updated by the second round of iteration, the structure of the topological graph no longer changes, thereby completing the process of compiling the computation graph into the intermediate representation based on the constraint relationships between the tensor variables in the computation graph.

Tensor variables with different aliases pointing to a same memory location are analyzed based on the intermediate representation: through the analysis on the topological graph of the intermediate representation, it is found that the set of pointers to the tensor variable x contains the element tensor variables x and z, so the tensor variables x and z in the computation graph have an alias relationship. The tensor variables x and z have the same memory address, indicating that the tensor variables x and z are the same tensor variable.

A register is allocated to the tensor variables in the computation graph. Since the tensor variables x and z have the same memory address, only one idle register needs to be allocated to the tensor variables x and z.

The intermediate representation method for compiling computation graphs as stated above provides a method for analyzing the tensor variables having an alias relationship that point to the same memory location in the computation graph. The tensor variables having an alias relationship that point to the same memory location in the computation graph are analyzed and stored in the same register. The intermediate representation method for compiling computation graphs provided by the disclosure optimizes the compilation efficiency of the tensor variables pointing to the same memory location in the computation graph, lowers the demand on the hardware memory resources during the execution of the computation graph and improves the execution efficiency of the computation graph during execution. In the process of developing algorithm models, researchers and engineering users can optimize the model by using the intermediate representation method and apparatus for compiling computation graphs, which improves the compilation efficiency of the computation graph and promotes the development of the application of deep neural network models.

Figure 14:
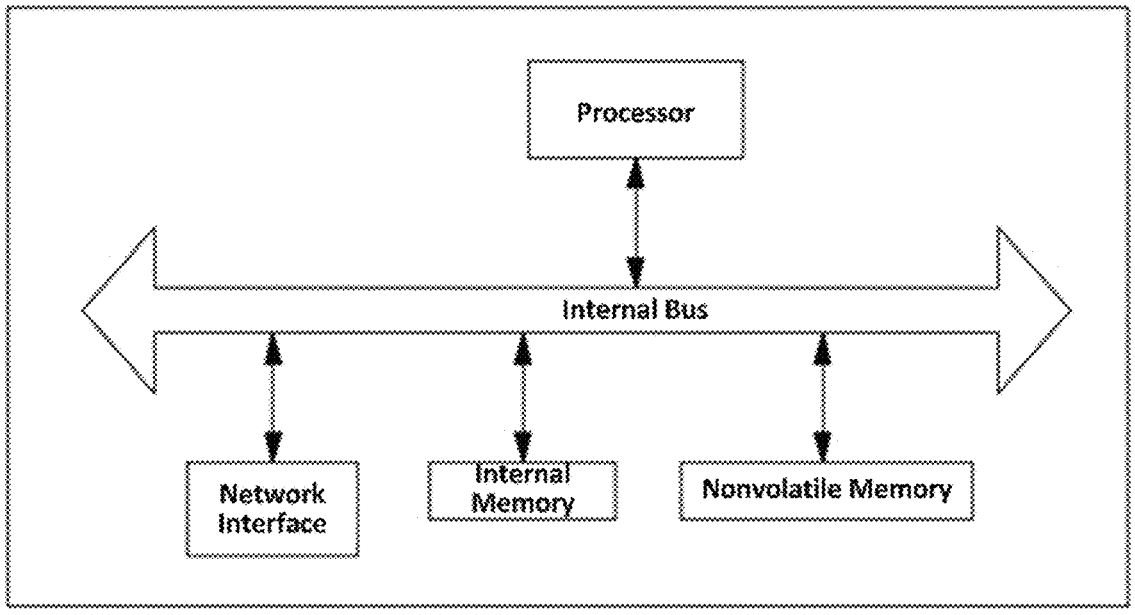
FIG. 14 is a schematic diagram of an apparatus according to an embodiment of the disclosure.

Referring to FIG. 14, an embodiment of the disclosure further provides an intermediate representation apparatus for compiling computation graphs, including an input device (unshown), an output device (unshown) and a data processing unit, wherein the data processing unit includes a memory and one or more processors. The memory has an executable code stored therein, and the one or more processors are configured to implement the intermediate representation method for compiling computation graphs according to any one of the embodiments above when executing the executable code. The input device is configured to input the neural network model to the data processing unit, the output device is configured to generate the executable code of the neural network model according to optimized computation graphs.

The embodiment of the intermediate representation apparatus for compiling computation graphs in the disclosure can be applied to any device having data processing capability, which may be a device or apparatus such as a computer. The apparatus embodiment may be implemented by software, hardware or a combination of hardware and software. The software implementation, for example, as an apparatus in the logical sense, is formed by reading a corresponding computer program instruction in a nonvolatile memory into an internal memory and running it through a processor of any device having data processing capability where it is located. From the aspect of hardware, FIG. 14 shows a hardware structure diagram of any device having data processing capability where the intermediate representation apparatus for compiling computation graphs of the disclosure is located. In addition to the processor, the internal memory, the network interface and the nonvolatile memory shown in FIG. 14, the any device having data processing capability where the apparatus is located in the embodiment may also include other hardware according to actual functions of the any device having data processing capability, which will not be described in detail. For the implementation process of the functions and effects of units in the above apparatus, reference can be made to the implementation process of the corresponding steps in the above method, which will not be repeated here.

Since the apparatus embodiment basically corresponds to the method embodiment, for the relevant parts, reference can be made to the parts of the description of the method embodiment. The apparatus embodiment described above is only schematic. The units described as separate components may or may not be physically separated, and the components displayed as units may or may not be physical units, that is, they may be located in one place, or may be distributed in a plurality of network units. Part or all of the modules may be selected according to actual needs to achieve the purposes of the solution of the disclosure. Those of ordinary skill in the art can understand and implement it without creative work.

An embodiment of the disclosure further provides a computer-readable storage medium having a program stored therein. The program, when being executed by a processor, implements the intermediate representation method for compiling computation graphs in the embodiment above.

The computer-readable storage medium may be an internal storage unit of the any device having data processing capability in any embodiment described above, for example, a hard disk or an internal memory. The computer-readable storage medium may also be an external storage device of the any device having data processing capability, for example, a plug-in hard disk, a Smart Media Card (SMC), an SD Card, a Flash Card, etc. provided on the device. Further, the computer-readable storage medium may also include both an internal storage unit and an external storage device of the any device having data processing capability. The computer-readable storage medium is used to store the computer program, and other programs and data required by the any device having data processing capability, and may be further used to temporarily store data that has been output or will be output.

The above description is only the preferred embodiments of the disclosure and is not intended to limit the disclosure. Any modifications, equivalent substitutions or improvements made within the spirit and scope of the disclosure shall be included within the protection scope of the disclosure.

What is claimed is:

1. An intermediate representation method for compiling computation graphs, comprising the following steps:

step 1: compiling a neural network into a computation graph for neural network computation on a computer;

step 2: constructing a node for each tensor variable in the computation graph;

step 3: associating the node representing the tensor variable in the computation graph to a set of pointers to the tensor variable;

step 4: analyzing constraint relationships between the tensor variables in the computation graph, comprising the following substeps:

step 4.1: defining a constraint representation of an address assignment operation between the tensor variables in the computation graph;

step 4.2: defining a constraint representation of an assignment operation between the tensor variables in the computation graph;

step 4.3: defining a constraint representation of a load operation of the set of pointers to the tensor variable in the computation graph; and step 4.4: defining a constraint representation of a store operation of the set of pointers to the tensor variable in the computation graph;

step 5: iteratively constructing a topological graph of the intermediate representation based on the constraint relationships between the tensor variables in the computation graph, comprising the following substeps:

step 5.1: constructing a propagation process of the intermediate representation of the computation graph based on the constraint representation of the assignment operation between the tensor variables;

step 5.2: constructing a loading process of the set of pointers to the tensor variable in the intermediate representation of the computation graph based on the constraint representation of the load operation of the set of pointers to the tensor variable; and step 5.3: constructing a storage process of the set of pointers to the tensor variable in the intermediate representation of the computation graph based on the constraint representation of the store operation of the set of pointers to the tensor variable; and step 6: analyzing the tensor variables with different aliases pointing to a same memory location based on the intermediate representation, and allocating a register for the tensor variables with different aliases.

2. The intermediate representation method for compiling computation graphs according to claim 1, wherein the defining the constraint representation of the address assignment operation between the tensor variables in the computation graph in the step 4.1 refers to a constraint representation method of assigning an address of the tensor variable b to the tensor variable a, comprising:

if the tensor variable b and the tensor variable a have a relationship that the address of the tensor variable b is assigned to the tensor variable a, then defining that the tensor variable b and the tensor variable a have a basic constraint relationship, wherein the set containing the tensor variable b is contained in the set of pointers to the tensor variable a.

3. The intermediate representation method for compiling computation graphs according to claim 1, wherein the defining the constraint representation of the assignment operation between the tensor variables in the computation graph in the step 4.2 refers to a constraint representation method of assigning the tensor variable b to the tensor variable a, comprising:

if the tensor variable b and the tensor variable a have a relationship that the tensor variable b is assigned to the tensor variable a, then defining that the tensor variable b and the tensor variable a have a constraint relationship of the assignment operation, wherein the set of pointers to the tensor variable b is contained in the set of pointers to the tensor variable a.

4. The intermediate representation method for compiling computation graphs according to claim 1, wherein the defining the constraint representation of the load operation of the set of pointers to the tensor variable in the computation graph in the step 4.3 refers to a constraint representation method of loading an element in the set of pointers to the tensor variable b to the set of pointers to the tensor variable a, comprising:

if the tensor variable a and the tensor variable b satisfy that the element in the set of pointers to the tensor variable b is assigned to the tensor variable a and the set of pointers to the tensor variable b contains a tensor variable t element, then defining that the tensor variables a and b have a constraint relationship, wherein the constraint relationship of the operation of loading the set of pointers to the tensor variable b to the set of pointers to the tensor variable a is defined as that a set of pointers to the tensor variable t is contained in the set of pointers to the tensor variable a.

5. The intermediate representation method for compiling computation graphs according to claim 1, wherein the defining the constraint representation of the store operation of the set of pointers to the tensor variable in the computation graph in the step 4.4 refers to a constraint representation method of storing the set of pointers to the tensor variable b into a set of pointers to an element in the set of pointers to the tensor variable a, comprising:

if the tensor variable b and the tensor variable a satisfy that: the set of pointers to the tensor variable b is assigned to the element of the set of pointers to the tensor variable a and the set of pointers to the tensor variable a contains a tensor variable t element, then it is defined that the tensors a and b have a constraint relationship, wherein the constraint relationship of storing the set of pointers to the tensor variable b into the set of pointers to the element in the set of pointers to the tensor variable a is defined as that the set of pointers to the tensor variable b is contained in the set of pointers to the element t in the set of pointers to the tensor variable a.

6. The intermediate representation method for compiling computation graphs according to claim 1, wherein the step 5.1 means that the set containing the tensor variable propagates along a direction of an edge of the computation graph based on the constraint representation, comprising the following substeps:

step 5.1.1: constructing an intermediate representation of the assignment operation in the computation graph for the constraint representation of the assignment operation in the computation graph, if the tensor variable b and the tensor variable a have a relationship that the tensor variable b is assigned to the tensor variable a, then the tensor variable b and the tensor variable a have a constraint representation, wherein the set of pointers to the tensor variable b is contained in the set of pointers to the tensor variable a;

step 5.1.2: constructing the topological graph based on the constraint representation of the assignment operation, comprising:

for the constraint relationship that the set of pointers to the tensor variable b is contained in the set of pointers to the tensor variable a, generating an edge from the node of the set of pointers to the tensor variable b to the node of the set of pointers to the tensor variable a in the topological graph based on the constraint relationship; and the propagation process of the tensor variables of the assignment operation in the topological graph comprises:

an execution flow of the computation graph passes through a constraint relationship edge representing the assignment operation, then the constraint relationship edge propagates from the node of the set of pointers to the tensor variable b to the node of the set of pointers to the tensor variable a, and the pointer of the end node of the constraint relationship also points to the set containing the tensor variable that the pointer of the start node of the constraint relationship edge points to.

7. The intermediate representation method for compiling computation graphs according to claim 1, wherein the step 5.2 means that the element in the set of pointers to the tensor variable b is loaded into the set of pointers to the tensor variable a, and the element in the set of pointers to the tensor variable b propagates along a direction of an edge of the computation graph based on the constraint representation, comprising the following substeps:

step 5.2.1: constructing an intermediate representation of the load operation in the computation graph for the constraint representation of the load operation in the computation graph, if the tensor variable b and the tensor variable a have a relationship that the element in the set of pointers to the tensor variable b is assigned to the tensor variable a and the set of pointers to the tensor variable b contains the tensor variable t element, then the constraint representation of the operation of loading the set of pointers to the tensor variable b to the set of pointers to the tensor variable a represents that the set of pointers to the tensor variable t is contained in the set of pointers to the tensor variable a;

step 5.2.2: constructing the topological graph based on the constraint representation of the load operation, comprising:

for the constraint relationship that the set of pointers to the tensor variable t element in the set of pointers to the tensor variable b is contained in the set of pointers to the tensor variable a, an edge from the node of the set of pointers to the tensor variable t to the node of the set of pointers to the tensor variable a is generated in the topological graph based on the constraint relationship; and the propagation process of the tensor variables of the load operation in the topological graph comprises:

an execution flow of the computation graph passes through a constraint relationship edge representing the load operation, and then the constraint relationship edge propagates from the node of the set of pointers to the corresponding element to the node of the set of pointers to the tensor variable a.

8. The intermediate representation method for compiling computation graphs according to claim 1, wherein the step 5.3 means that the set of pointers to the tensor variable b is stored into the set of pointers to the element in the set of pointers to the tensor variable a, and the set of pointers to the tensor variable b propagates along a direction of an edge of the computation graph based on the constraint representation, comprising the following substeps:

step 5.3.1: constructing an intermediate representation of the store operation in the computation graph for the constraint representation of the store operation in the computation graph, if the tensor variable b and the tensor variable a have a relationship that the set of pointers to the tensor variable b is assigned to the element of the set of pointers to the tensor variable a and the set of pointers to the tensor variable a contains the tensor variable t element, then the constraint representation of storing the set of pointers to the tensor variable b into the set of pointers to the element in the set of pointers to the tensor variable a represents that the set of pointers to the tensor variable b is contained in the set of pointers to the element t in the set of pointers to the tensor variable a;

step 5.3.2: constructing the topological graph based on the constraint representation of the store operation, comprising:

for the constraint relationship that the set of pointers to the tensor variable b is contained in the set of pointers to the tensor variable t, generating an edge from the node of the set of pointers to the tensor variable b to the node of the set of pointers to the tensor variable t in the topological graph based on the constraint relationship; and the propagation process of the tensor variables of the store operation in the topological graph comprises:

an execution flow of the computation graph passes through a constraint relationship edge representing the store operation, and then the constraint relationship edge propagates from the node of the set of pointers to the tensor variable b to the node of the set of pointers to the corresponding element t in the set of pointers to the tensor variable a.

9. The intermediate representation method for compiling computation graphs according to claim 1, wherein the step 6 comprises:

if it is found that the set of pointers to a certain tensor variable in the topological graph of the intermediate representation contains tensor variables with different aliases, considering the tensor variables with different aliases as the same tensor variable because of the same memory address, and allocating a same idle register for the tensor variables with different aliases.

10. An intermediate representation apparatus for compiling computation graphs, comprising a memory and one or more processors, wherein the memory has an executable code stored therein, and the one or more processors are configured to implement the intermediate representation method for compiling computation graphs according to claim 1 when executing the executable code.

\* \* \* \* \*